United States Patent
Field-Eliot et al.

(10) Patent No.: US 8,856,887 B2
(45) Date of Patent: Oct. 7, 2014

(54) METHODS AND APPARATUS FOR DELEGATED AUTHENTICATION TOKEN RETRIEVAL

(75) Inventors: Bryan Field-Eliot, Santa Barbara, CA (US); Sateesh Narahari, Aurora, CO (US); Paul Madsen, Ottawa (CA)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 13/544,565

(22) Filed: Jul. 9, 2012

(65) Prior Publication Data

US 2014/0013396 A1 Jan. 9, 2014

(51) Int. Cl.
G06F 15/16 (2006.01)

(52) U.S. Cl.
USPC .............................. 726/4; 713/172; 713/185

(58) Field of Classification Search
USPC .................... 713/172, 182; 726/4, 6
See application file for complete search history.

(56) References Cited

U.S. PATENT DOCUMENTS

| | | | |
|---|---|---|---|
| 6,021,438 A * | 2/2000 | Duvvoori et al. | 709/224 |
| 6,728,766 B2 * | 4/2004 | Cox et al. | 709/220 |
| 6,826,696 B1 * | 11/2004 | Chawla et al. | 726/4 |
| 7,500,262 B1 | 3/2009 | Sanin et al. | |
| 7,743,153 B2 | 6/2010 | Hall et al. | |
| 8,060,448 B2 | 11/2011 | Jones | |
| 8,266,684 B2 | 9/2012 | Kline et al. | |
| 8,281,149 B2 | 10/2012 | Laurie et al. | |
| 8,302,170 B2 | 10/2012 | Kramer et al. | |
| 8,347,355 B2 | 1/2013 | Mower et al. | |
| 8,437,742 B2 | 5/2013 | Garskof | |
| 8,533,796 B1 | 9/2013 | Shenoy et al. | |
| 2003/0200202 A1 | 10/2003 | Hsiao et al. | |
| 2005/0240763 A9 * | 10/2005 | Bhat et al. | 713/169 |
| 2006/0070114 A1 | 3/2006 | Wood et al. | |
| 2008/0140529 A1 * | 6/2008 | Agarwal et al. | 705/14 |
| 2008/0148351 A1 | 6/2008 | Bhatia et al. | |
| 2008/0170693 A1 | 7/2008 | Spies et al. | |
| 2008/0256616 A1 | 10/2008 | Guarraci et al. | |
| 2009/0113527 A1 * | 4/2009 | Naaman et al. | 726/5 |
| 2009/0133031 A1 | 5/2009 | Inoue | |
| 2009/0187975 A1 | 7/2009 | Edwards, Jr. et al. | |
| 2009/0271847 A1 | 10/2009 | Karjala et al. | |
| 2010/0257578 A1 | 10/2010 | Shukla | |
| 2011/0265173 A1 | 10/2011 | Naaman et al. | |
| 2011/0296522 A1 | 12/2011 | Speyer et al. | |

(Continued)

OTHER PUBLICATIONS

Fletcher et al., OAuth Use Cases draft-ietf-oauth-use-cases-00; May 23, 2012, pp. 1-23.*

(Continued)

*Primary Examiner* — Harunur Rashid
(74) *Attorney, Agent, or Firm* — Cooley LLP

(57) ABSTRACT

In some embodiments, a non-transitory processor-readable medium includes code to cause a processor to send, from an authorization client on a device to a client authorization module, an indication of multiple applications installed on the device, and receive, at the authorization client and in response to the indication, multiple application tokens from the client authorization module. Each individual application token from the multiple application tokens received by the authorization client is uniquely associated with an application from the multiple applications installed on the device. The authorization client provides each application its associated application token such that each application from the multiple applications can use that application token in order to be authenticated to an application server associated with the application.

20 Claims, 4 Drawing Sheets

(56) References Cited

U.S. PATENT DOCUMENTS

| | | | |
|---|---|---|---|
| 2011/0321131 | A1 | 12/2011 | Austel et al. |
| 2012/0017001 | A1 | 1/2012 | Braddy et al. |
| 2012/0110646 | A1 | 5/2012 | Ajitomi et al. |
| 2012/0117626 | A1 | 5/2012 | Yates et al. |
| 2012/0144202 | A1* | 6/2012 | Counterman ............... 713/176 |
| 2012/0144501 | A1 | 6/2012 | Vangpat et al. |
| 2012/0265997 | A1 | 10/2012 | Laurie et al. |
| 2012/0291090 | A1 | 11/2012 | Srinivasan et al. |
| 2012/0291114 | A1 | 11/2012 | Poliashenko et al. |
| 2013/0007864 | A1 | 1/2013 | Puflea |
| 2013/0054968 | A1 | 2/2013 | Gupta |
| 2013/0055362 | A1 | 2/2013 | Rathbun |
| 2013/0086645 | A1 | 4/2013 | Srinivasan et al. |
| 2013/0086670 | A1 | 4/2013 | Vangpat et al. |
| 2013/0086679 | A1 | 4/2013 | Beiter |
| 2013/0144755 | A1* | 6/2013 | Mowatt et al. ............ 705/26.41 |
| 2013/0312068 | A1 | 11/2013 | Mortimore |

OTHER PUBLICATIONS

"Migrating tokens to system accounts," Twitter Developers, Nov. 7, 2011, Retrieved from the Internet: <URL: http://www.dev.twitter.com/docs/ios/migrating-tokens-core-accounts/> (3 pages).

"API requests with TWRequest" Twitter Developers, Jan. 5, 2012, Retrieved from the Internet: <URL: http://www.dev.twitter.com/docs/ios/making-api-requests-twrequest> (3 page).

Ryan Whitwam, "How Android Smartly Manages Your Accounts and Logins," Tested News, Jun. 8, 2011, Retrieved from the Internet: <URL: http://www..tested.com/news/feature/2437-how-android-smartly-manages-your-accounts-and-logins/> (4 pages).

"iOS Twitter framework," Twitter Developers, Dec. 5, 2011, Retrieved from the Internet: <URL: http://dev.twitter.com/docs/ios> (3 pages).

"AccountManager," Android Developers, Retrieved from the Internet: <URL: http://developer.android.com/reference/android/accounts/AccountManager.html> , Jan. 18, 2012 (11 pages).

"PackageManager," Android Developers, Retrieved from the Internet: <URL: http://developer.android.com/reference/android/content/pm/PackageManager.html>, Jul. 9, 2012 (41 pages).

"Authenticating to OAuth2 Services", Android Developers, Retrieved from the internet: http://developer.android.com/training/id-auth/authenticate.html, Jan. 2, 2013.

"Google Play Services", Android Developers, Retrieved from the Internet: https://developer.android.com/google/play-services/index.html, Jan. 2, 2013.

"Partner Programs Allow Mobile Application Developers to Easily Integrate with Active Directory Authentication and Deliver 'Zero Sign-On' to Enterprise Users", Oct. 18, 2012.

U.S. Office Action dated Oct. 9, 2012, mailed in U.S. Appl. No. 13/544,553.

Using OAuth 2.0 to Access Google APIs, Google Developers, Jun. 26, 2012, Retrieved from the Internet: <URL: https://developers.google.com/accounts/docs/OAuth2> (6 pages).

Integrating OAuth with Mobile Apps, Travis Spencer—Software Engineer, Sep. 2, 2011, Retrieved from the Internet: <URL: http://travisspencer.com/blog/2011/09/integrating-oauth-with-mobile.html> (4 pages).

"Single Sign On Authentication," AuthenticationWorld.com, The business of Authentication, © 2006 Huntington Ventures Ltd., Retrieved from the Internet: <URL: http://www.authenticationworld.com/Single-Sign-On-Authentication/> (2 pages).

Hardt, D.; "The OAuth 2.0 Authorization Framework", Internet Engineering Task Force (IETF), RFC 6749, Oct. 2012 (77 pages).

Google Developers; "Using Oauth 2.0 for Web Server Applications", Google Accounts Authentication and Authorization, Captured via Internet Archieve on May 8, 2013, Published on Apr. 18, 2013 (7 pages).

Office Action for U.S. Appl. No. 13/774,653 mailed May 24, 2013.
Office Action for U.S. Appl. No. 13/737,525 mailed May 2, 2013.
Office Action for U.S. Appl. No. 14/018,079, mailed Dec. 11, 2013.
International Search Report and Written Opinion for International Application No. PCT/US13/049669, mailed Aug. 20, 2013.
International Search Report and Written Opinion for International Application No. PCT/US13/40526, mailed Dec. 30, 2013.
International Search Report and Written Opinion for International Application No. PCT/US13/74362, mailed Jan. 14, 2014.
International Search Report and Written Opinion for International Application No. PCT/US13/76380, mailed Jan. 29, 2014.

* cited by examiner

300

---

Send, from an authorization client on a device to a client authorization module, an indication of a set of applications installed on the device.
302

---

Receive, at the authorization client and in response to the indication, a set of application tokens from the client authorization module, each application token from the set of application tokens being uniquely associated with an application from the set of applications.
304

---

Provide each application from the set of applications its respective application token such that each application from the set of applications can be authenticated to an application server associated with that application from the set of applications using its application token.
306

FIG. 3

METHODS AND APPARATUS FOR DELEGATED AUTHENTICATION TOKEN RETRIEVAL

CROSS-REFERENCE TO RELATED APPLICATIONS

This application is related to co-pending U.S. patent application Ser. No. 13/544,553, filed on the same date, and entitled "Methods And Apparatus For Preprovisioning Authentication Tokens To Mobile Applications," which is incorporated herein by reference in its entirety.

BACKGROUND

Some embodiments described herein relate generally to using a single authorization client module on a device to request application tokens for applications installed on the device from an authorization server. Some of the embodiments described herein also relate to the methods and apparatus used for the authentication and execution of the approved applications for individual users of a device.

Open Authorization (OAuth) is an open standard protocol for authorization, and allows a user, such as an enterprise employee, to grant a third party application access to information associated with that user stored at a given location (e.g., on given website), without sharing that user's account credentials (e.g. password) or the full extent of that user's data. Some known systems use OAuth tokens to authenticate applications for users of a variety of devices (e.g., a laptop computer, a personal digital assistant (PDA), a standard mobile telephone, a tablet personal computer (PC), etc.). Such known systems, however, have each application request tokens individually from an appropriate OAuth authorization server. This typically involves significant use of available bandwidth and processor time, and generally leads to a usability burden for the user. Additionally, the enterprise for which the employee works is not directly involved in the issuance of application tokens to the applications and hence is removed from a desired level of policy control over the users' access to applications.

Accordingly, a need exists for methods and apparatus for authenticating multiple applications installed on a device in a single step for specific user(s) of that device. Additionally, a need exists for methods and apparatus to increase the involvement of the enterprise in having control of over the user's access to applications.

SUMMARY

In some embodiments, a non-transitory processor-readable medium includes code to cause a processor to send, from an authorization client on a device to a client authorization module, an indication of multiple applications installed on the device, and receive, at the authorization client and in response to the indication, multiple application tokens from the client authorization module. Each individual application token from the multiple application tokens received by the authorization client is uniquely associated with an application from the multiple applications installed on the device. The authorization client provides each application its associated application token such that each application from the multiple applications can use that application token in order to be authenticated to an application server associated with the application.

BRIEF DESCRIPTION OF THE DRAWINGS

FIG. 3 is a flow chart illustrating a method of obtaining individual application tokens for a set of applications installed on a device, according to an embodiment.

DETAILED DESCRIPTION

Figure 1:
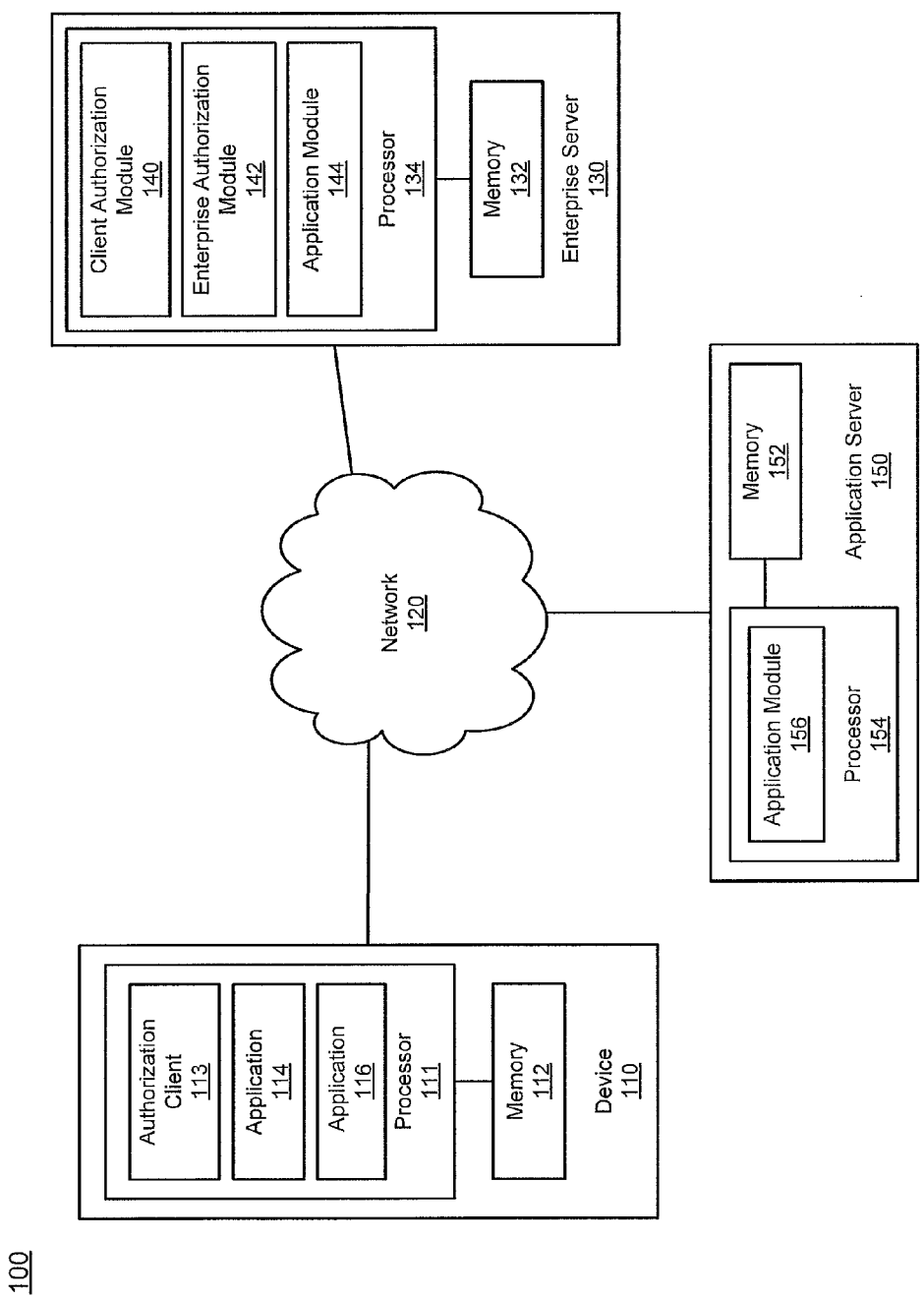
FIG. 1 is a schematic illustration of an application authorization system that includes a device connected to an enterprise server and an application server via a network, according to an embodiment.

In some embodiments, a non-transitory processor-readable medium includes code to cause a processor to send, from an authorization client on a device to a client authorization module, an indication of multiple applications installed on the device, and receive, at the authorization client and in response to the indication, multiple application tokens from the client authorization module. Each individual application token from the multiple application tokens received by the authorization client is uniquely associated with an application from the multiple applications installed on the device. The authorization client provides each application its associated application token such that each application from the multiple applications can use that application token in order to be authenticated to an application server associated with the application.

In such embodiments, the device can be a personal computing device such as a desktop computer, a laptop computer, a personal digital assistant (PDA), a standard mobile telephone, a tablet personal computer (PC), and/or the like. The device can include a memory and a processor. The applications installed on the device can be, for example, accounting applications, sales force applications, payroll applications and/or the like. In other embodiments, the applications can be any other enterprise or third-party applications configured to run at the device. In some embodiments, the authorization client can be a native application installed on the device. The authorization client can be a hardware and/or software module stored in the memory and/or executed in the processor of the device. In some embodiments, the authorization client can be configured to query the client authorization module for a list of applications that are authorized for use by the user of the device. In some embodiments, the authorization client can be configured to send to the client authorization module a list of applications (from the set of approved applications) that are installed on the device. The authorization client can be configured to send application authorization requests for multiple applications installed on the device to the client authorization module on an enterprise or cloud server via a network. The network can be any type of network such as a local area network (LAN), a wide area network (WAN), a virtual network, a telecommunications network, implemented as a wired network and/or wireless network. In response to the authorization request, the authorization client can receive application tokens for all authorized applications for the user of the device from the client authorization module. Note that, in some embodiments, a single application authorization request can be sent for multiple applications installed on the device and multiple application tokens can be generated from the single application authorization request. In some embodiments, the authorization client can be configured to receive a second message from the client authorization module that contains a list of applications that are unauthorized for use by the user of the device. Upon receiving the applications tokens, the authorization client can be configured to provide each authorized application the individual application token associated with it. This allows the authorized applications on the device to use its associated application token to contact and receive application data from the application server associated with it.

In such embodiments, the enterprise server can be a web server, an application server, a proxy server, a telnet server, a file transfer protocol (FTP) server, a mail server, a list server, a collaboration server and/or the like. The enterprise server can include a memory and a processor. The memory of the enterprise server can contain data associated with a client authorization module, an enterprise authorization module and an application module. The client authorization module can be a hardware and/or software module stored in the memory and executed in the processor of the enterprise server. The client authorization module can be configured to receive, from an authorization client at a device, an application token request associated with multiple applications installed on the device. In response to the request, the client authorization module can be configured to send multiple applications tokens, each of which is uniquely associated with an authorized application for the user of the device. In some embodiments, the client authorization module can be configured to receive an authentication request from an application module associated with an approved application. The authentication request can include the application token uniquely associated with an authorized application. The client authorization module can use the application token to assess the validity of and/or verify the attributes of the application token. Upon successfully verifying the received application token as a valid token for the application, the client authorization module can be configured to send an authentication signal to the application module. This can allow the application module to send application data to the authorized application on the device.

In some embodiments, a non-transitory processor-readable medium includes code to cause a processor to intercept, at an authorization client on a device an indication that a user associated with the device has requested to launch an application installed on the device such that the application does not receive the indication. The code causes the processor to send, from an authorization client on a device to a client authorization module, in response to the indication, a request for an application token for the application, and receive, at the authorization client and in response to the request, the application token from the client authorization module. The code can cause the processor on the device to associate, at the authorization client, the application token with the application at the device, and then send the indication to the application such that the application launches with the application token in response to the indication.

FIG. 1 is a schematic illustration of an application authorization system 100, according to an embodiment. The application authorization system 100 includes a device 110, a network 120, an enterprise server 130 and an application server 150. The network 120 can be any type of network (e.g., a local area network (LAN), a wide area network (WAN), a virtual network, a telecommunications network) implemented as a wired network and/or wireless network. As described in further detail herein, in some embodiments, for example, the device 110 can be connected to the enterprise server 130 and the application server 150 via an intranet, an Internet Service Provider (ISP) and the Internet, a cellular network (e.g., network 120), and/or the like.

The device 110 can be a personal computing device such as a desktop computer, a laptop computer, a personal digital assistant (PDA), a standard mobile telephone, a tablet personal computer (PC), and/or so forth. The device 110 includes a memory 112 and a processor 111. In some embodiments, the device 110 is configured to request and receive user tokens from the enterprise server 130. The device 110 can also be configured to request and receive application tokens from the enterprise server 130 and/or access application modules at the application server 150 and/or enterprise server 130 via the network 120 as described in further detail herein.

The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 stores instructions to cause the processor to execute modules, processes and/or functions associated with such an application authorization system 100.

The processor 111 can be a general purpose processor, a Field Programmable Gate Array (FPGA), an Application Specific Integrated Circuit (ASIC), a Digital Signal Processor (DSP), and/or the like. The processor 111 can be configured to run and/or execute application authorization processes and/or other modules, processes and/or functions associated with an application authorization system 100. The processor 111 includes an authorization client 113, an application 114 and an application 116.

The authorization client 113 can be a native application installed on the device 110. The authorization client 113 can be hardware and/or software module (stored in memory 112 and executed in a processor 111) that sends application authentication information to the client authorization module 140 for a set of applications 114 and 116 executed in the processor 111 and/or stored in memory 112. The authorization client 113 can be configured to receive an application token for each application 114 and 116, as described in further detail herein.

The applications 114 and 116 can be hardware and/or software modules (stored in memory 112 and executed in a processor 111) configured to receive application tokens from the authorization client 113 and cause the processor 111 to execute specific operations. For example, applications 114 and 116 can be associated with particular functions in an enterprise. For example, the applications 114 and 116 can be accounting applications, sales force applications, payroll applications and/or the like. In other embodiments, applications 114 and 116 can be any other enterprise or third party applications configured to be run and/or executed at the device 110.

The enterprise server 130 can be, for example, a web server, an application server, a proxy server, a telnet server, a file transfer protocol (FTP) server, a mail server, a list server, a collaboration server and/or the like. In some embodiments, the enterprise server 130 is configured to receive user authentication and/or application authentication requests from the device 110 and generate user tokens and application tokens in response to such requests. In some embodiments, the enterprise server 130 can also execute modules, processes and/or functions associated with such an application authorization system 100.

The enterprise server 130 includes a processor 134 and a memory 132. The memory 132 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 132 stores instructions to cause the processor to execute modules, processes and/or functions associated with such an application authorization system 100.

The processor 134 can be a general purpose processor, a Field Programmable Gate Array (FPGA), an Application Specific Integrated Circuit (ASIC), a Digital Signal Processor (DSP), and/or the like. In some embodiments, processor 134 can be configured to run and/or execute application modules, processes and/or functions associated with such an application authorization system 100. For example, processor 134 can be configured to run and/or execute modules, processes, and/or functions associated with or in response to user and application authentication requests. The processor 134 includes a client authorization module 140, an enterprise authorization module 142 and an application module 144.

The client authorization module 140 can be a hardware and/or software module (stored in memory 132 and/or executed in a processor 134) that receives user authentication information and/or application authentication information from the device 110 via the network 120. In some embodiments, the client authorization module 140 can be configured to generate and/or define application tokens for applications 114 and 116 on the device 110. In some embodiments, the client authorization module 140 can be configured to generate and/or define user tokens for users associated with the device 110. In some embodiments, the client authorization module 140 can send user tokens and application tokens to the authorization client 113, as described in further detail herein.

The enterprise authorization module 142 can be a hardware and/or software module (stored in memory 132 and executed in a processor 134) that receives individual user tokens from the authorization client 113 via the network 120. The enterprise authorization module 142 can be configured to determine a set of applications 114 and/or 116 that are approved for use by the user of the device 110 and can be installed on that device 110. As described in further detail herein, in some embodiments, the enterprise authorization module 142 can send the list of approved applications 114 and/or 116 to the authorization client 113 and/or the client authorization module 140.

The application module 144 can be hardware and/or software module (stored in memory 132 and/or executed in a processor 134) configured to provide application data to applications 114 and/or 116 via the network 120. For example, in instances where application 114 is a payroll application, the application data provided by the application module 144 can include data on employee salary, hours worked, taxes and other withholdings, method of payment and/or the like. In some embodiments, such application data enables applications 114 and/or 116 to execute modules, processes and/or functions associated with the application authorization system 100. In some embodiments and as described in further detail herein, the application module 144 receives and processes an application token from the device 110 prior to providing application data to the applications 114 and/or 116.

The application server 150 can be a third party server distinct from the entity (e.g., company) with which the enterprise server 130 is associated. The application server 150 can be a Software as a Service (SaaS) host which can be, for example, a web server, a proxy server, a telnet server, a file transfer protocol (FTP) server, a mail server, a list server, a collaboration server, and/or the like.

The application server 150 includes a processor 154 and a memory 152. The memory 152 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 152 stores instructions to cause the processor 154 to execute modules, processes and/or functions associated with application server 150 within the application authorization system 100.

The application module 156 can be hardware and/or software module (stored in memory 152 and/or executed in a processor 154) configured to provide application data to applications 114 and 116 via the network 120. For example, the application data can include results of external market analysis for a product of the enterprise and/or the like. This application data can be used by the applications 114 and/or 116, for example, to set the retail price of the product, and/or to calculate the expected profit levels for the product, and/or to determine locations for the best retail vendors available for the product, and/or the like. In some embodiments, the application module 156 can receive and process an application token from the device 110 prior to providing application data to the applications 114 and/or 116. Such application data can enable applications 114 and 116 to execute modules, processes and/or functions associated with the application authorization system 100.

Figure 2:
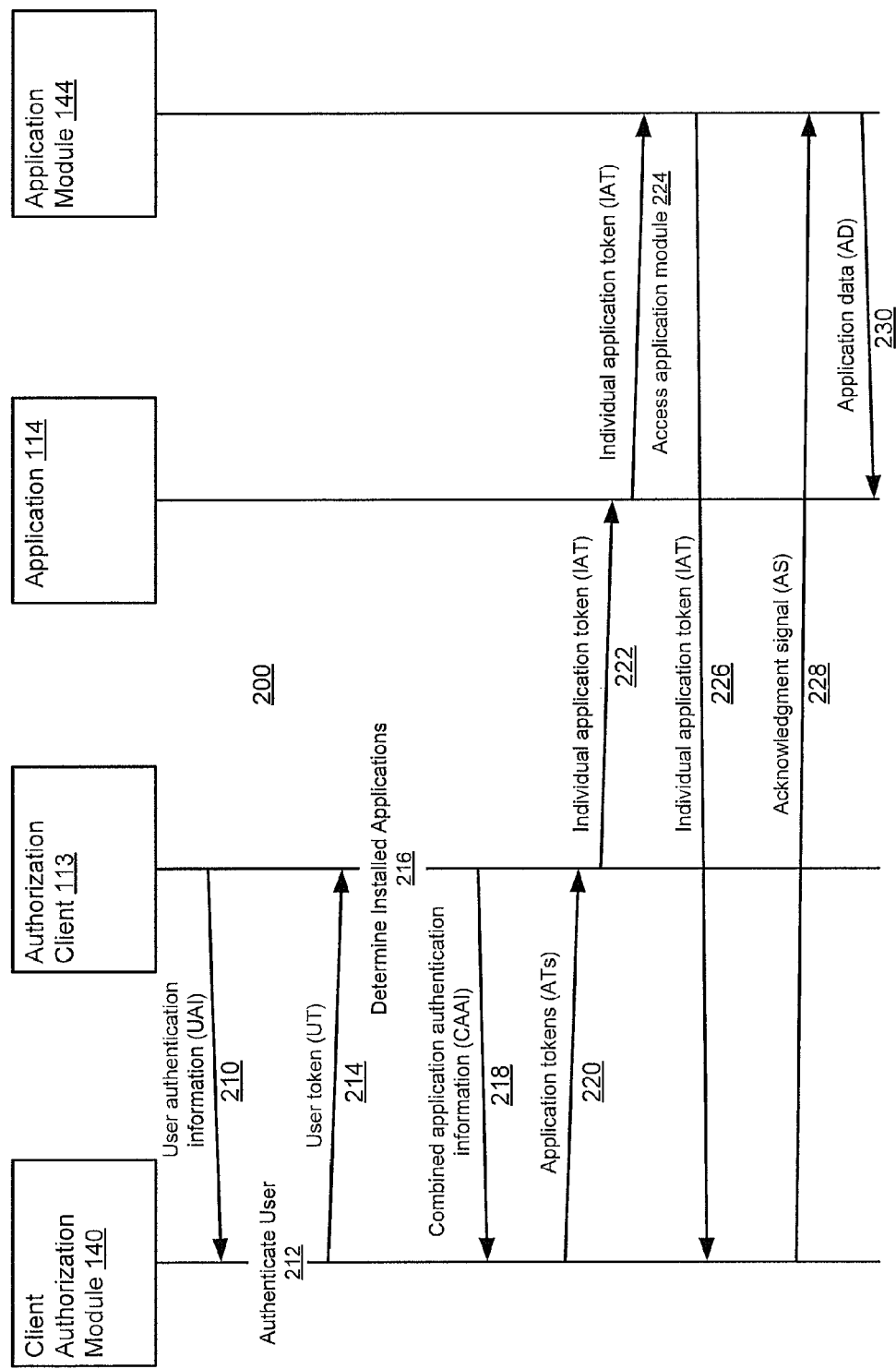
FIG. 2 is a message flow diagram illustrating a method of authenticating a user and the approved applications on a device of an application authorization system 100, according to an embodiment.

FIG. 2 is a message flow diagram illustrating a method 200 of authenticating a user and its approved application 114 on a device 110 of an application authorization system 100, according to an embodiment. This embodiment includes the authorization client 113 receiving multiple application tokens from the client authorization module 140 at substantially the same time, with each application token being associated with an approved application for a user of a device 110. At 210, the authorization client 113 initiates the authentication of the user at the client authorization module 140 using the OAuth 2.0 protocol through the network 120. Authentication can be performed via the authorization client 113 or via a mobile browser window. Authentication can be performed via presentation of an identifier such as, for example, user authentication information (UAI), which can include, a user login, a user password, an employee ID number, a personal identification number (PIN), biometric information (e.g., data associated with a fingerprint scan, a retinal scan, etc.), an employee security/access level, an enterprise division code, and/or the like.

The client authorization module 140 receives the user authentication information UAI from the authorization client 113 or a mobile browser via the network 120 and authenticates the user, at 212. In some embodiments, the client authorization module 140 can authenticate the user by matching the user authentication information UAI to a specific entry in a user authentication database or a look-up table stored in the memory 132 of the enterprise server 130. The user authentication database can include, for example, a list of employees and their corresponding employment positions and security/access level, social security numbers, employee personal identification numbers (PIN), and/or the like. In other embodiments, the user database can be stored in the memory of another device (e.g. server not shown) coupled to the network 120. In various embodiments, the client authorization module 140 can authenticate the user using any suitable authentication protocol such as, for example, Secure Sockets Layer (SSL), Secure Shell (SSH), Kerberos, and/or the like.

Upon successful authentication of the user, the client authorization module 140 can generate and/or define a user token (UT) for a user of the device 110. The client authorization module 140 can send the user token UT via the network 120 to the authorization client 113, at 214. In some embodiments, for example, the user token UT can include an encrypted form of a user identity number that has been assigned to the approved user. In other embodiments, the user token UT can include, for example, additional encrypted or unencrypted user credentials such as a user security/access level, user employment position, a device identifier, and/or the like. In other embodiments, any other suitable method for authenticating a user can be performed as an alternative to steps 210, 212 and 214. In still other embodiments, the user is not authenticated.

In response to receiving the user token UT from the client authorization module 140, the authorization client 113 can determine, at 216, which applications are installed on the device 110. In some embodiments, the authorization client 113 can check if a specific universal resource locator (URL) scheme is supported by the device 110 and if so, determine what applications 114 or 116 have used the URL scheme to register itself on the device 110. In other embodiments, the authorization client 113 can poll the applications 114 or 116 on the device 110 for a unique application identifier. In still other embodiments, the authorization client 113 can query a database and/or a portion of memory 112 storing a list of unique identifiers of the installed applications 114 and 116. On determining the different applications 114 and 116 installed on the device 110, the authorization client 113 can generate a unique identifier associated with each installed application.

The authorization client 113 can generate the combined application authentication information (CAAI) for all of the installed applications 114 and 116 on the device 110, and at 218 can send the combined application authentication information CAAI as a single message to the client authorization module 140 via the network 120 (using the previously issued UT). The combined application authentication information CAAI can include, for example, a list of the unique identifiers of the installed applications 114 and 116 on the device 110, user name and password for each client application, a user token and/or the like in order to report to the client authorization module 140 which specific applications are installed on the device. In some embodiments, the combined application authentication information CAAI can include additional information, for example, a user identification number, a user security/access level and/or a list of potentially authorized applications for the user of the device 110.

In some embodiments, the client authorization module 140 can extract the application identification information associated with each application 114 from the received combined application authentication information CAAI. The client authorization module 140 can use the application identification information to query an application authorization database or a look-up table stored in the memory 132 of the enterprise server 130 for an entry associated with the extracted application identification information to determine which applications are authorized for the given user of the device 110. If such an entry is found, the client authorization module 140 can confirm or reject the validity of such an entry and generate a list of applications approved for the user by the enterprise. The client authorization module 140 can also determine which applications 114 and/or 116 are not approved for the user of the device 110. In other embodiments, the application authorization database can be stored in the memory of another server (not shown in FIG. 1) operatively coupled to the network 120. In various embodiments, the client authorization module 140 can authenticate the list of approved applications using any suitable authentication protocol such as, for example, Secure Sockets Layer (SSL), Secure Shell (SSH), Kerberos, and/or the like.

The client authorization module 140 can generate and/or define multiple application tokens (ATs), each for an individual approved application 114 or 116 installed on the device 110, and at 220 sends the multiple application tokens ATs to the device 110 via the network 120. For example, in some embodiments, the multiple application tokens ATs can include an encrypted or unencrypted form of a user personal identity number (PIN), a user security/access level, a device identification number, a client authorization module 140 address, a application identity number assigned to each approved application, an associated application module 144 or 156 address, and/or the like. In other embodiments, the multiple application tokens ATs can include additional encrypted or unencrypted application credentials such as the release date of the applications, the specific features and/or resources of the applications that have been approved for the user, a duration for which the application token AT is valid, and/or the like. In some embodiments, multiple application tokens ATs can be, for example, Open Authorization (OAuth) tokens, OpenID tokens, and/or the like.

In other embodiments, the client authorization module 140 with which the authorization client 113 directly interacts can obtain application tokens ATs from another client authorization module (e.g., a client authorization module more closely associated with particular application modules). For example, the client authorization module 140 can be an enterprise client authorization module 140 that requests one ore more application tokens AT from an SAAS client authorization module (not shown in FIG. 2) in response to receiving the combined application authentication information CAAI from the authorization client 113 at 218. The SAAS client authorization module can send the application tokens to the client authorization module 140, which can send the application tokens AT to the authorization client 113, at 220.

The authorization client 113 receives the multiple application tokens ATs, an application token AT for each of the approved applications 114 or 116 for the user of the device 110 via the network 120. The authorization client 113 can identify which application token ATs is associated with which application 114 or 116 by matching the unique application identification number in that application token AT to an entry in a database and/or a portion of memory 112 storing a list of unique identifiers of the installed applications 114 or 116. At 222, the authorization client 113 can send each individual application token (IAT) to its respective approved application 114 or 116 on the device 110. For example, as shown in FIG. 2, at 222, an individual application token IAT is sent to application 114. While not shown, the authorization client 113 can also send another individual application token IAT to application 116.

Each approved application 114 and 116 for the user receives the individual application token IAT specific for that application 114 or 116 from the authorization client 113. In some embodiments, the application 114 can extract the application module address from the received individual application token IAT, and at 224 send the individual application token IAT to the appropriate application module 144 or 156 via the network 120. In other embodiments, the application 114 can retrieve the address of the associated application module 144 or 156 (e.g., an IP address) from a portion of the memory 112 that stores information associated with the application 114. The application 114 can then send the individual application token IAT to the appropriate application module 144 or 156 via the network 120. In some embodiments, the application module 144 associated with the application 114 is on the enterprise server 130. In other embodiments, the application module 156 associated with the application 114 is on a third-party application server 150 that is authorized and configured to provide application data to applications 114 and/or 116 on the device 110. In some embodiments, the application 114 can wait to receive an indicator that a user would like to launch the application 114 prior to sending the IAT to the application module 144. For example, the application 114 can wait to receive an indicator that a user has selected an icon associated with the application 114.

At 224, the application module 144 or 156 can receive via the network 120 the individual application token IAT from the application 114 approved for use on the device 110. In some embodiments, the application module 144 or 156 can extract the address of the client authorization module 140 from the received individual application token IAT. In some embodiments, the application module 144 can be located on the enterprise server processor 134 and at 226 can send the individual application token IAT to the client authorization module 140 (e.g. via the processor bus). In other embodiments, the application module 156 can be located on a third-party application server 150 and can send the individual application token IAT to the client authorization module 140 via the network 120 at 226.

In some embodiments, the client authorization module 140 at 226 can receive the individual application token IAT from the application modules 144 and/or 156 and can assess the validity of and/or verify the attributes of the individual application token IAT. In some embodiments, the client authorization module 140 can perform this verification by querying a database or a look-up table stored in the memory 132 of the enterprise server 130 for an entry that corresponds to the individual application token IAT. In other embodiments, the database or look-up table can be stored in the memory of a different server operatively coupled to the network 120. For example, the client authorization module 140 can acknowledge if the individual application token IAT for an approved application 114 or 116 for the user has been received. In another example, the client authorization module 140 can acknowledge if the approved functionalities of the application 114 or 116 has been activated for the user. In yet another example, the client authorization module 140 can acknowledge if the time stamp on the individual application token IAT is valid, and/or the like.

In some embodiments, the client authorization module 140 at 228 can send an acknowledgement signal (AS) to the application module 144 on the enterpriser server 130. In other embodiments, at 228, the client authorization module 140 can send an AS to the application module 156 on a third party application server 150 via the network 120. In some embodiments the acknowledgement signal AS can include data or information on application attributes. For example, the acknowledgement signal AS can contain a list of the functionalities of the application 114 approved for the user, the functionalities of the application 114 not approved for the user, how long the application 114 can be run per session on the device 110, a data sequence that gives permission to the application module 144 to send application data to the application 114, and/or the like.

In some embodiments, upon receiving the acknowledgement signal AS from the client authorization module 140, the application module 144 or 154 can at 230 send application data (AD) via the network 120 to the application 114 for use during execution of the application 114 on the device 110. For example, if the application 114 is a sales application, the application data AD can include a representation of the price of a unit of a product, the number of units sold in a month, the number of units required in pending orders, the revenue generated from all sales in a month, the profits earned in a month, and/or the like. In some embodiments, the application 114 can use the application data AD to populate a table for display to the user. In another example, if the application 114 is a human resource (HR) application, the application data AD can include a user employee number, a user social security number, an employee status code, an enterprise code for paid time off (PTO), and/or the like. In some embodiments, the application 114 can allow the user to use this data to calculate the total number of hours worked that can be charged to the enterprise in a pay cycle, and/or the like. In other embodiments, the application module 114 can wait to send the application data to the application 114 until a specific request for data is received from the application 114. For example, the application 114 can send such a request for data to the application module 144 in response to receiving an indicator that a user would like to launch the application 114.

It should be noted that the embodiment of the application authorization system 100 as described in FIGS. 1 and 2 involves the authorization client 113 obtaining information relevant to authentication of all the applications 114 and 116 installed on the device 110. The authorization client 113 can bundle together the application authentication information for each applications 114 and 116 into a single request, the combined application authentication information (CAAI), and send the combined application authentication information CAAI to the client authorization module 140 via the network 120 at 218. Upon successful authentication, the client authorization module 140 can generate and/or define application tokens ATs 416 for each application 114 and 116. The client authorization module 140 can send all the generated ATs in a single response to the authorization client 140 via the network 120 at 220. The authorization client 113 can distribute and send each individual application token IAT to its respective application 114 or 116 at 222.

In other embodiments, the authorization client 113 can be configured to send the user token UT received at 214 to the enterprise authorization module 142 via the network 120 (not shown in FIG. 2). In some such embodiments, the enterprise authorization module 142 can extract a user identity number from the user token UT to query a user-authorized application database or look-up table stored in the memory 132 of the enterprise server 130 for an entry associated with the user identity number. If such an entry is valid, the enterprise authorization module 142 can generate a list of applications approved for the user by the enterprise. The enterprise authorization module 142 can send the list of approved applications in a data package (e.g., a JSON package) to the authorization client 113 via the network 120. In another embodiment, the client authorization module 140 can send the user token UT to the enterprise authorization module 142 of the enterprise server 130. The enterprise authorization module 142 can generate a list of approved applications for the user as described above, and send the list of approved applications in a data package (e.g., a JSON package) with the user token UT back to the authorization client 113 via the network 120.

In some embodiments, one or more of the steps shown in FIG. 2 can be optional to implement the application authorization system 100. For example, in some embodiments, the application module 144 can directly assess the validity of and/or verify the attributes of the individual application token IAT. In such an embodiment, steps associated with events 226 and 228 in FIG. 2 can be avoided in implementing the application authorization system 100. In some such embodiments, the application module 144 can perform this verification by querying a database or a look-up table stored in the memory 132 of the enterprise server 130 for an entry that corresponds to the individual application token IAT. For example, the application module 144 can acknowledge if an individual application token IAT for an approved application for the user has been received. In another example, the application module 144 can acknowledge if the approved functionalities of the application have been activated for the user. In yet another example, the application module 144 can acknowledge if the time stamp on the individual application token IAT is valid and/or the like. Upon acknowledging the validity of the individual application token IAT, the application module 144 can send application data 230 via the network 120 to the application 114 on the device 110 for use during execution of the application 114. In other embodiments, the application module 144 can use any other suitable method for authenticating the application using the application token such as, for example, by signature validation. Thus, steps 224, 226, 228 and 230 can be modified accordingly.

FIG. 3 is a flow chart illustrating a method 300 of obtaining individual application tokens for a set of applications installed on a device, according to another embodiment. The method 300 includes sending from an authorization client on a device to a client authorization module an indication of a set of applications installed on the device, at 302. As discussed above, in some embodiments, the device can be a personal computing device such as a desktop computer, a laptop computer, a personal digital assistant (PDA), a standard mobile telephone, a tablet personal computer (PC), and/or so forth. As discussed above, the authorization client can be a hardware and/or software module stored in the memory and/or executed in a processor of a device. Similarly, the client authorization module can be a hardware and/or software module stored in the memory and executed in a processor of an enterprise server.

The authorization client can receive a set of application tokens from the client authorization module in response to sending the indication of the set of applications installed on the device, at 304. Each application token from the set of application tokens is uniquely associated with a client application from the set of applications installed on a device. As discussed above, in some embodiments, the application token can include a user personal identity number (PIN), user security/access level, the specific features and resources of the application that have been approved for the user, an indication of the duration for which the application token is valid, and other information that can allow the applications to run effectively on the device.

The authorization client can provide each application from the set of approved applications its respective application token, at 306. The applications can send the application tokens to the associated application server for authentication. For example, authentication can involve ascertaining if an application token for an approved application for the user was sent from the application to the application module. In another example, authentication can involve ascertaining if the approved functionalities of the application specific for the user have been activated. In yet another example, authentication can involve ascertaining if the time stamp on the application token is valid. Upon successful authentication, the application server can send application data for use during execution of the application installed on the device.

In some embodiments, application tokens can have a limited life span. Similarly stated, in some embodiments, application tokens can expire after a predetermined time period. In such applications it can be advantageous to retrieve an application token for an application when that application first needs that application token. This ensures that the application token as not already expired by the time the application receives an instruction to launch and/or authenticate with an application module.

Figure 4:
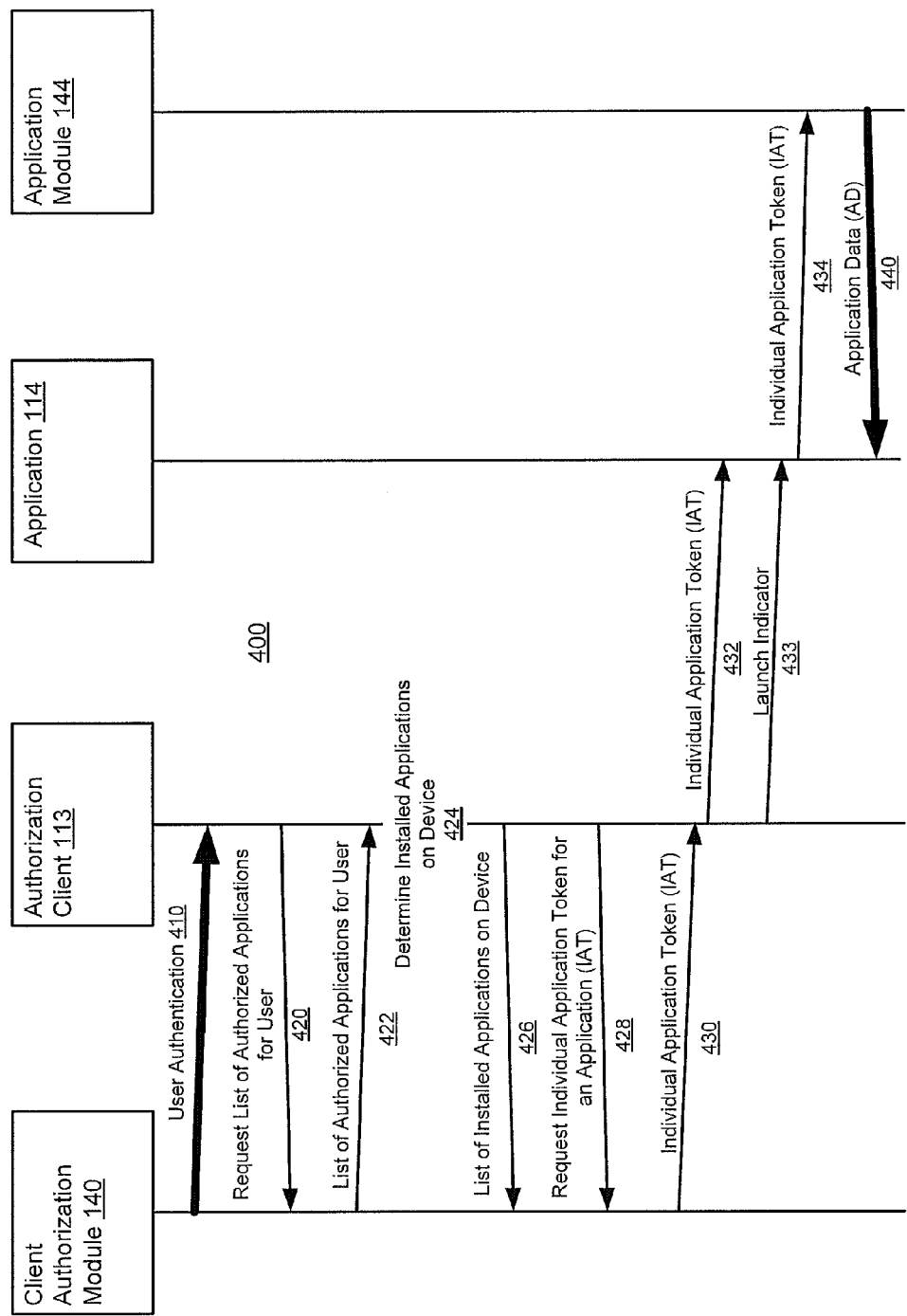
FIG. 4 is a message flow diagram illustrating a method of authenticating a user and its approved application on a device of an application authorization system, according to another embodiment.

FIG. 4, for example, is a message flow diagram illustrating a method 400 of authenticating a user and its approved application 114 on a device 110 of an application authorization system 100, according to another embodiment. This embodiment includes the authorization client 113 receiving an individual application token from the client authorization module 140 upon intercepting a signal that is generated when a user associated with the device 110 has requested to launch an application 114 before the application 114 receives the signal. In this embodiment, the steps involving user authentication can be similar to the user authentication steps shown and described with respect to FIG. 2 (steps 210-214), and have been lumped together and represented by the step 410.

In some embodiments, upon successful authentication of the user, the authorization client 113 can send a request to the client authorization module 140 for a list of approved/authorized applications 114 and 116 for the user of the device 110 via the network 120, at 420. The request can be in form of a data package (e.g., a JSON package) and can include encrypted or unencrypted data associated with the user and/or device such as, for example, a user identification number, a user security/access level, a user employment position, a device identifier user ID, a client authorization module 140 address, and/or the like. The client authorization module 140 can generate and/or define a list of authorized applications for the user in response to the request. The list of authorized applications can include identifiers for each authorized application. The client authorization module 140 can send the list of authorized applications in a data package (e.g., a JSON package) to the authorization client 113 via the network 120, at 422. In other embodiments, the authorization client 113 does not send a request to the client authorization module 140 for a list of approved/authorized applications 114 and 116 and the client authorization module 140 does not send the list of authorized applications to the authorization client 113. Thus, in some embodiments, steps 420 and 422 are optional.

In some embodiments, in response to receiving the list of authorized applications from the client authorization module 140, the authorization client 113 can determine, at 424, which applications are installed on the device 110. In some embodiments, the authorization client 113 can check if a specific universal resource locator (URL) scheme is supported by the device 110 and if so, determine what applications 114 or 116 have used the URL scheme to register itself on the device 110. In other embodiments, the authorization client 113 can poll the applications 114 or 116 on the device 110 for a unique application identifier. In still other embodiments, the authorization client 113 can query a database and/or a portion of memory 112 storing a list of unique identifiers of the installed applications 114 and 116. On determining the different applications 114 and 116 installed on the device 110, the authorization client 113 can generate a unique identifier associated with each installed application, and generate a list of installed applications on the device 110. At 426, the authorization client 113 sends the list of installed applications on the device 110 in a data package (e.g., a JSON package) to the client authorization module 140 via the network 120. In other embodiments, the authorization client 113 does not determine which applications are installed on the device 110 and does not send the list of installed applications on the device 110 to the client authorization module 140. Thus, in some embodiments, steps 424 and 426 are optional.

In some embodiments, the authorization client 113 can intercept a signal that is generated when a user associated with the device 110 has requested to launch an application 114, before the application 114 receives the signal. In some embodiments, for example, the processor 111 of the device 110 can receive an indication that a user has selected to launch the application 114. Such a selection can be, for example, a user selecting an icon associated with that application. Instead of sending the launch indication directly to the application 114, the authorization client 113 can intercept the launch indication. As discussed in further detail herein, the authorization client 113 prevents the application 114 from receiving the launch indication until an application token is requested and received.

Upon intercepting this signal, the authorization client 113 can send a request for an individual application token IAT for the application to the client authorization module 140 via the network 120, at 428. The request can be in form of a data package (e.g., a JSON package) and can include encrypted or unencrypted data associated with the application such as, for example, an application identifier, a device identification number, a client authorization module 140 address, and/or the like.

The client authorization module 140 can generate and/or define an individual application token IAT, for the requested application 114 or 116 on the device 110, and at 430 send the individual application token IAT to the authorization client 113 via the network 120. For example, in some embodiments, the individual application token IAT can include an encrypted or unencrypted form of a user personal identity number (PIN), a user security/access level, a device identification number, a client authorization module 140 address, an application identity number assigned to the requested application, an associated application module 144 or 156 address, and/or the like. In other embodiments, the individual application token IAT can include additional encrypted or unencrypted application credentials such as the release date of the application, the specific features and/or resources of the requested application that have been approved for the user, a duration for which the individual application token IAT is valid, and/or the like. In some embodiments, the individual application token IAT can be, for example, an Open Authorization (OAuth) token, an OpenID token, and/or the like. The client authorization module 140 sends the individual application token IAT to the authorization client 113 via the network 120, at 430.

In other embodiments, the client authorization module 140 with which the authorization client 113 directly interacts can obtain the individual application token IAT from another client authorization module (e.g., a client authorization module more closely associated with the application module 144). For example, the client authorization module 140 can be an enterprise client authorization module 140 that requests the individual application token IAT from an SAAS client authorization module (not shown in FIG. 3) in response to receiving the request for the individual application token for an application from the authorization client 113 at 428. The SAAS client authorization module can send the application tokens to the client authorization module 140, which can send the individual application token IAT to the authorization client 113, at 430.

The authorization client 113 receives the individual application token (IAT) for the requested application 114 on the device 110 via the network 120. The authorization client 113 can identify with which application 114 the received individual application token IAT is associated by matching the unique application identification number in that individual application token IAT to an entry in a database and/or a portion of memory 112 storing a list of unique identifiers of the installed applications 114 or 116. At 432, the authorization client 113 sends the individual application token IAT to the requested application 114 on the device 110. Additionally, at 433, the authorization client 113 sends the launch indicator 433 to the application 114 on the device 110. Similarly stated, the authorization client 113 sends the launch indicator previously intercepted by the authorization client 113 to the application 114. The launch indicator can instruct the application 114 to launch and/or begin execution.

The requested application 114 receives the individual application token IAT specific for that application 114 and the launch indicator from the authorization client 113. In some embodiments, the application 114 can extract the application module address from the received individual application token IAT and/or the launch indicator, and at 434 send the individual application token IAT to the appropriate application module 144 or 156 via the network 120. In other embodiments, the application 114 can retrieve the address of the associated application module 144 or 156 (e.g., an IP address) from a portion of the memory 112 that stores information associated with the application 114. The application 114 can then send the individual application token IAT to the appropriate application module 144 or 156 via the network 120, at 434 and in response to launching based on the launch indicator. In some embodiments, the application module 144 associated with the application 114 is on the enterprise server 130. In other embodiments, the application module 156 associated with the application 114 is on a third-party application server 150 that is authorized and configured to provide application data to applications 114 and/or 116 on the device 110. The steps involved in authenticating the individual application token IAT and sending application data AD to the application 114 can be similar to those described in the embodiment of FIG. 2 (steps 226-230), and have been lumped together and represented by step 440. In some embodiments, as an alternative to steps 226-228 in FIG. 2, which have the application module 144 call back to the client authorization module 140 for an acknowledgement signal AS, the application module 144 can directly and/or locally validate the individual application token IAT by, for example, signature validation at the application module 144. In other embodiments, the application module can validate the individual application token IAT using any other suitable validation method.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A non-transitory processor-readable medium storing code representing instructions to be executed by a processor, the code comprising code to cause the processor to:
    send, at a first time, from an authorization client on a device to a client authorization module, an indication of a plurality of applications installed on the device, subsequent to intercepting a request to launch at least one application from the plurality of applications such that the application is prevented from receiving the indication;
    receive, at a second time after the first time, at the authorization client and in response to the indication, a plurality of application tokens from the client authorization module, each application token from the plurality of application tokens being uniquely associated with an application from the plurality of applications; and
    provide, using the authorization client, each application from the plurality of applications its associated application token from the plurality of application tokens such that each application from the plurality of applications is authenticated to an application server associated with that application from the plurality of applications when its associated application token is received at the application server.

2. The non-transitory processor-readable medium of claim 1, wherein the code to cause the processor to send includes code to cause the processor to:
    send, from the authorization client to the client authorization module, an identifier associated with an access level of a user associated with the device, the plurality of applications being associated with the access level.

3. The non-transitory processor-readable medium of claim 1, further comprising code to cause the processor to:
    determine, prior to sending the indication, an identifier associated with each application from the plurality of applications installed on the device.

4. The non-transitory processor-readable medium of claim 1, wherein the authorization client is a native application installed on the device.

5. The non-transitory processor-readable medium of claim 1, wherein a first application from the plurality of applications is an enterprise application, a second application from the plurality of applications is a Software as a Service (SaaS) application.

6. The non-transitory processor-readable medium of claim 1, wherein the plurality of applications is a first plurality of applications installed on the device, the indication being an indication of the first plurality of applications and a second plurality of applications installed on the device, the code further comprising code to cause the processor to:
    receive an indication that a user associated with the device is unauthorized to use each application from the second plurality of applications.

7. An apparatus, comprising:
    an authorization client installed on a device associated with a user, the authorization client configured to send, at a first time, to a client authorization module, an application token request associated with a plurality of applications installed on the device, subsequent to intercepting a request to launch an application from the plurality of applications such that the application is prevented from receiving the indication, the authorization client configured to receive, at a second time after the first time, in response to the application token request, (1) a set of application tokens associated with a first set of applications from the plurality of applications, and (2) an indication that the user associated with the device is unauthorized to use each application from a second set of applications from the plurality of applications and mutually exclusive of the first set of applications, each application token from the set of application tokens being uniquely associated with an application from the first set of applications,
    the authorization client configured to provide each application from the first set of applications with its associated application token from the set of application tokens such that each application from the first set of applications is authenticated to an application server associated with that application when its associated application token is received at the application server.

8. The apparatus of claim 7, wherein the authorization client is configured to send an identifier associated with the user to the client authorization module, the authorization client configured to receive, in response to the identifier, a user authorization token, the authorization client configured to provide the user authorization token to the client authorization module with the client token request.

9. The apparatus of claim 7, wherein the application server is at least one of a Software as a Service (SaaS) host or an enterprise host.

10. The apparatus of claim 7, wherein the authorization client is configured to retrieve, prior to sending the application token request, a plurality of identifiers, each identifier from the plurality of identifiers being uniquely associated with an application from the plurality of applications installed on the device, the application token request being based at least in part on the plurality of identifiers.

11. The apparatus of claim 7, wherein each token from the set of application tokens is an OAuth access token.

12. An apparatus, comprising:
    a client authorization module configured to receive, at a first time, from an authorization client at a client device, subsequent to the authorization client intercepting a request to launch at least one application from a plurality of applications installed on the client device such that the at least one application is prevented from receiving the indication, an application token request associated with the plurality of applications, the client authorization module configured to send, at a second time after the first time, in response to the application token request, a plurality of tokens to the authorization client such that the authorization client provides each application from the plurality of applications with a uniquely associated token from the plurality of tokens, the client authorization module configured to receive an authentication request from an application module associated with an application from the plurality of applications, the authentication request including a token from the plurality of tokens and uniquely associated with that application, the client authorization module configured to send an authentication signal to the application module in response to the client authorization module verifying the token as a valid token for the application.

13. The apparatus of claim 12, wherein the client authorization module is configured to receive an identifier associated with a user of the client device, the client authorization module configured to send, in response to the identifier, a user authorization token associated with an access right of the user.

14. The apparatus of claim 12, wherein the client authorization module and the application module are included in an enterprise server.

15. The apparatus of claim 12, wherein the client authorization module is hosted at a first host device, the application module is hosted at a second host device different from the first host device.

16. A non-transitory processor-readable medium storing code representing instructions to be executed by a processor, the code comprising code to cause the processor to:

intercept, at an authorization client on a device and at a first time, an indication that a user associated with the device has requested to launch an application installed on the device such that the application is prevented from receiving the indication;

send at a second time after the first time, from the authorization client to a client authorization module and in response to the indication, a request for an application token for the application;

receive, at the authorization client and in response to the request, the application token from the client authorization module;

associate, using the authorization client, the application token with the application at the device; and send, using the authorization client and after associating the application token with the application, the indication to the application such that the application launches with the application token and in response to the indication.

17. The non-transitory processor-readable medium of claim 16, wherein the code to cause the processor to send the request includes code to cause the processor to:

send, from the authorization client to the client authorization module, an identifier associated with an access level of the user, the application being approved for the access level.

18. The non-transitory processor-readable medium of claim 16, wherein the authorization client is a native application installed on the device.

19. The non-transitory processor-readable medium of claim 16, wherein the code to cause the processor to associate includes code to cause the processor to associate the application token with the application such that the application is authenticated to at least one of a Software as a Service (SaaS) host associated with the application or an enterprise host associated with the application based on the application token after launching the application.

20. The non-transitory processor-readable medium of 16, wherein the indication is a first indication, the code to cause the processor to associate includes code to cause the processor to associate at a third time, the code further comprising code to cause the processor to:

intercept, at the authorization client and at a fourth time after the third time, a second indication that the user associated with the device has requested to launch the application;

determine that the application token is associated with the application at the device; and send the second indication to the application such that the application launches with the application token in response to the second indication.

* * * * *